J. J. PAYER.
BUNDLE CARRYING ATTACHMENT FOR HARVESTERS AND THE LIKE.
APPLICATION FILED OCT. 29, 1913.
1,157,719.
Patented Oct. 26, 1915.
5 SHEETS—SHEET 1.
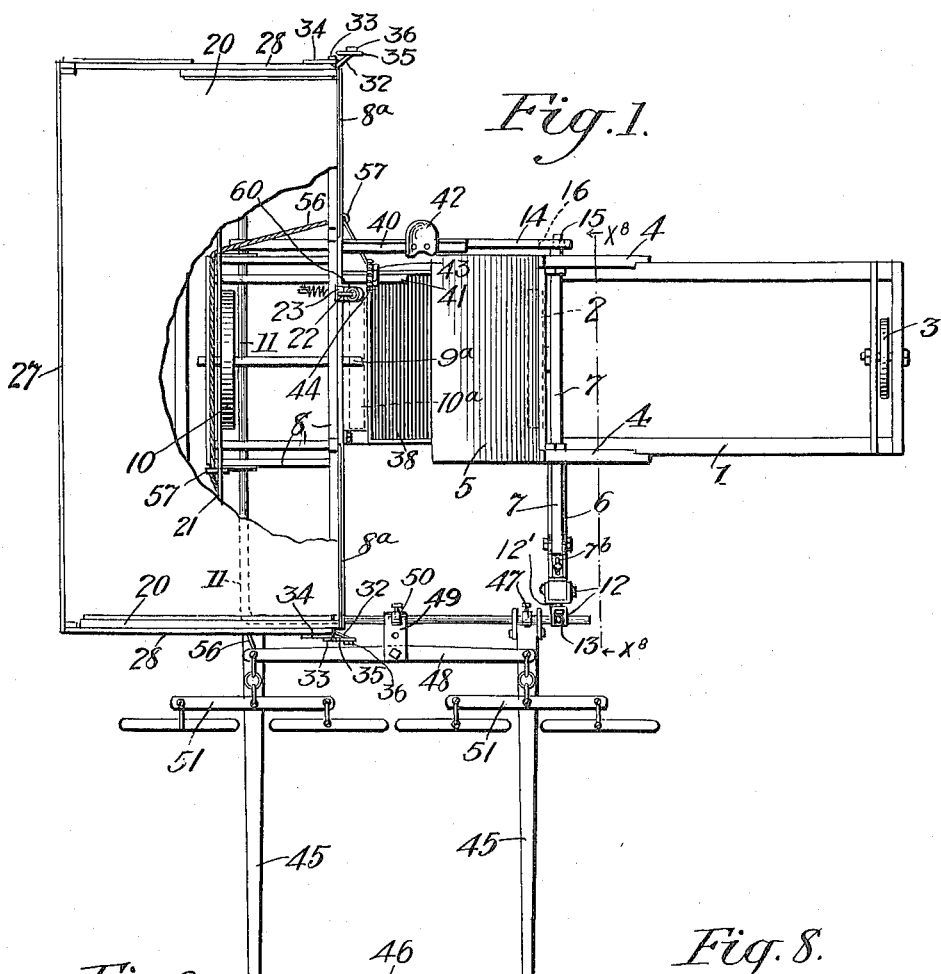
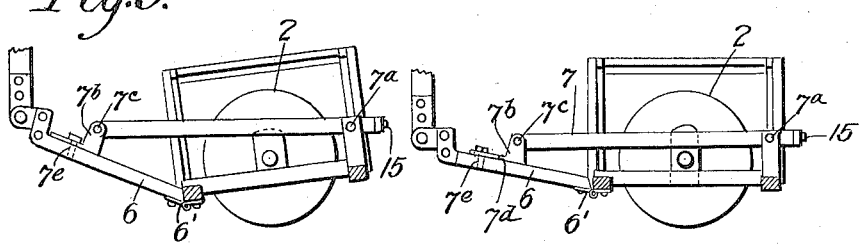

J. J. PAYER.
BUNDLE CARRYING ATTACHMENT FOR HARVESTERS AND THE LIKE.
APPLICATION FILED OCT. 29, 1913.
1,157,719.
Patented Oct. 26, 1915.
5 SHEETS—SHEET 2.
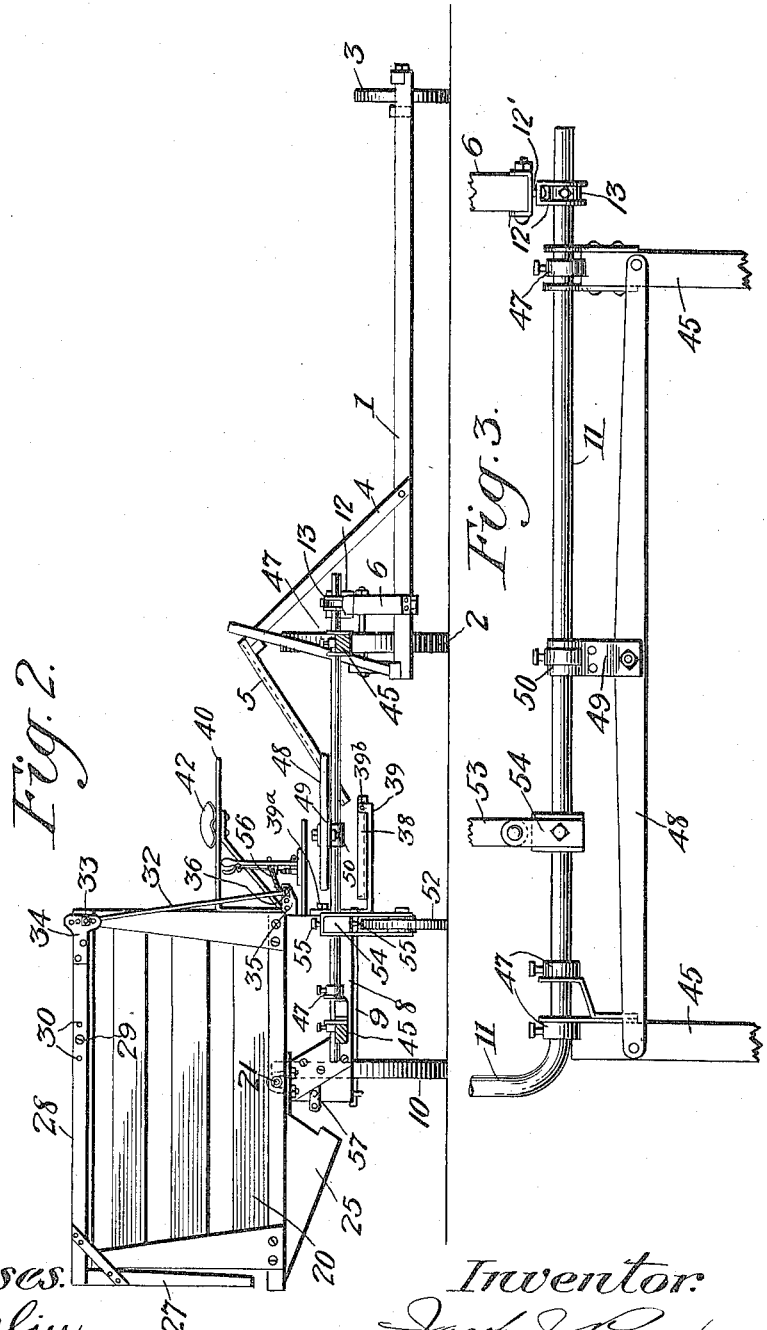

J. J. PAYER.
BUNDLE CARRYING ATTACHMENT FOR HARVESTERS AND THE LIKE.
APPLICATION FILED OCT. 29, 1913.
1,157,719.
Patented Oct. 26, 1915.
5 SHEETS—SHEET 3.
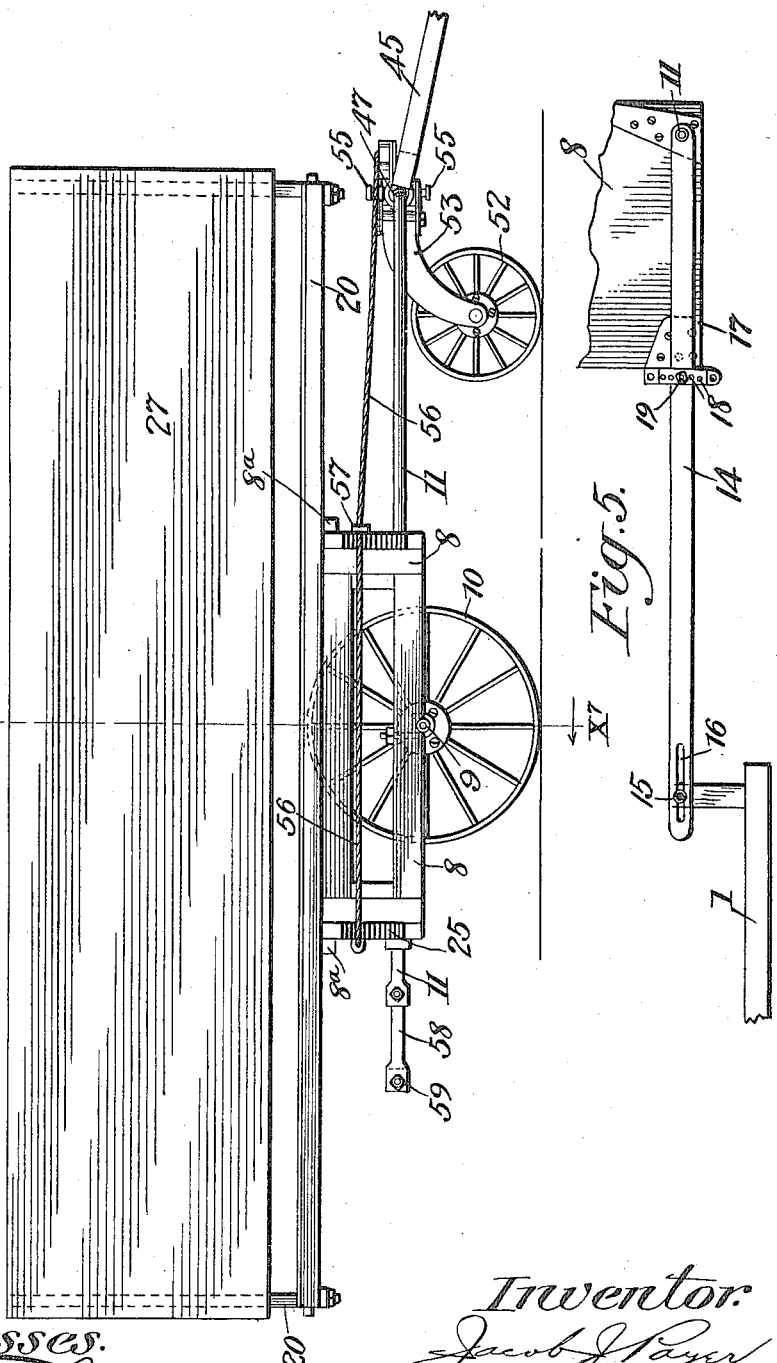

J. J. PAYER.
BUNDLE CARRYING ATTACHMENT FOR HARVESTERS AND THE LIKE.
APPLICATION FILED OCT. 29, 1913.
1,157,719.
Patented Oct. 26, 1915.
5 SHEETS—SHEET 4.
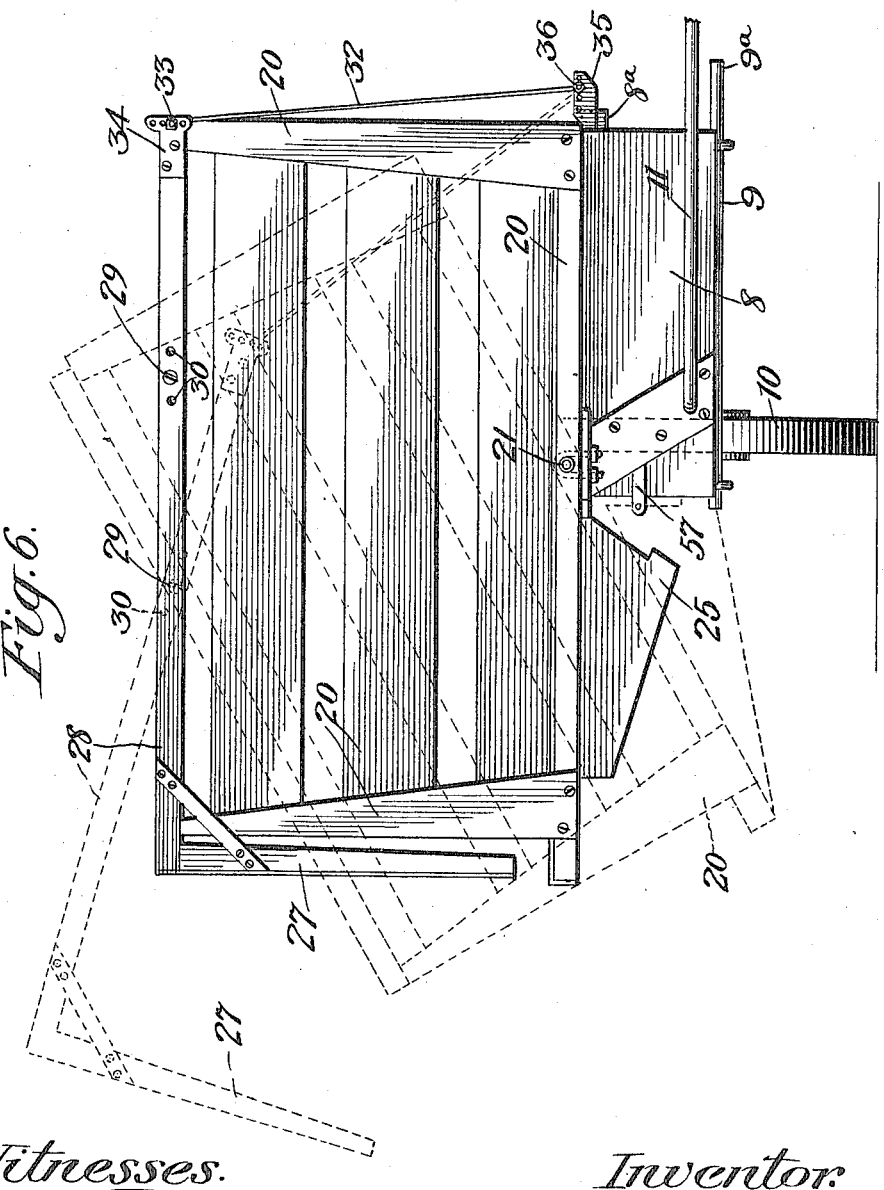

J. J. PAYER.
BUNDLE CARRYING ATTACHMENT FOR HARVESTERS AND THE LIKE.
APPLICATION FILED OCT. 29, 1913.
1,157,719.
Patented Oct. 26, 1915.
5 SHEETS—SHEET 5.
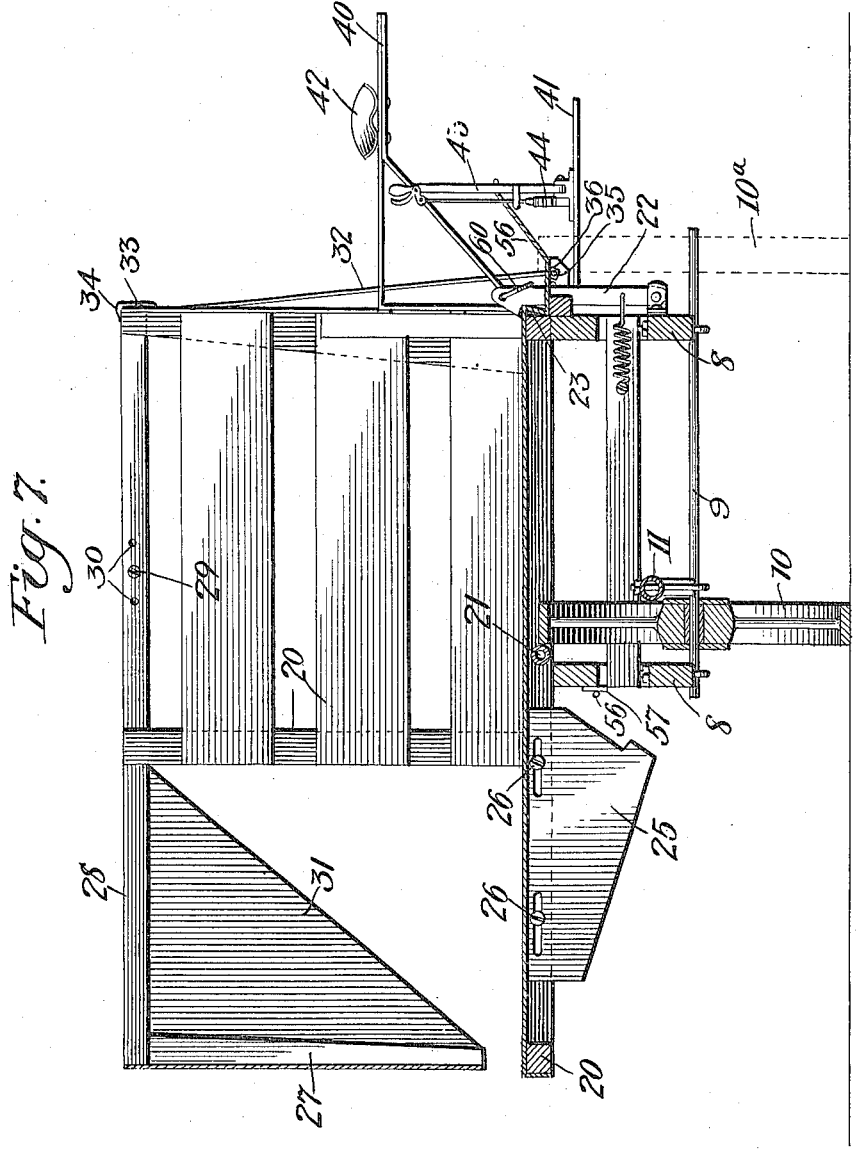

UNITED STATES PATENT OFFICE.

JACOB J. PAYER, OF ADAMS, NORTH DAKOTA.

BUNDLE-CARRYING ATTACHMENT FOR HARVESTERS AND THE LIKE.

1,157,719.   Specification of Letters Patent.   Patented Oct. 26, 1915.

Application filed October 29, 1913. Serial No. 798,069.

*To all whom it may concern:*

Be it known that I, JACOB J. PAYER, a citizen of the United States, residing at Adams, county of Walsh, and State of North Dakota, have invented certain new and useful Improvements in Bundle-Carrying Attachments for Harvesters and the like; and I do hereby declare the following to be a full, clear, and exact description of the invention, such as will enable others skilled in the art to which it appertains to make and use the same.

A bundle carrying attachment for grain harvesters is disclosed in my copending application, Serial No. 676,814, filed Feb. 10, 1912, said attachment having a large capacity, so that a large number of bundles may be carried with the harvester and then deposited in a large load.

The advantages of the so-called bundle carrying rack have been enumerated in the pending application above referred to, and since the present application relates more particularly to the manner of connecting the rack to the harvester, and certain other features which are independent of the construction of the rack *per se*, it is not necessary to reiterate the said advantages of the rack.

Broadly stated, this invention consists, among other things, in connecting the bundle carrying attachment to the harvester, so that all side draft is eliminated by equalizing the draft between the attachment and the harvester. Otherwise stated, the attachment is connected to the harvester in such a way as to cause the line of draft to coincide with the median line of the combined harvester and attachment, certain adjustments being provided to change the line of draft when the attachment is adjusted closer to or farther from the harvester, whereby the line of draft can always be maintained at the proper place. The attachment is adjusted closer to or farther from the harvester by certain means, which also forms a part of the present invention.

The invention further consists in making the attachment readily detachable from the harvester and readily connectable therewith, by the provision of simple means for accomplishing this result and by planning the construction, so that the attachment may be secured to the harvester at the most convenient places.

Furthermore, the invention consists in so proportioning and positioning the parts of the attachment that an equal balancing is obtained, whereby one main supporting wheel for the entire attachment will serve to properly support the same.

As will hereinafter appear, the invention also contemplates the provision of certain other adjustments, and a special arrangement of parts, whereby the advantages hereinafter enumerated may be obtained.

Referring to the drawings: Figure 1 is a plan view showing a harvester in diagram or outline and showing my improved bundle carrier attachment and auxiliary devices connected to the harvester; Fig. 2 is a front elevation of the complete machine shown in Fig. 1, some parts being sectioned and some parts being broken away; Fig. 3 is an enlarged plan view showing the manner in which the draft devices are connected to the machine; Fig. 4 is a right side elevation of the bundle carrying attachment; Fig. 5 is a detail view in rear elevation, some parts being broken away, showing the rear connection between the bundle carrier attachment and the frame of the harvester; Fig. 6 is a view in front elevation showing by full lines the position of the rack of the bundle carrier, and by dotted lines showing the position of the rack when in a dumping position; Fig. 7 is a transverse section taken through the bundle carrying attachment on the line $x^7$ $x^7$ on Fig. 4, Fig. 8 is a section on line $x^8$ $x^8$ of Fig. 1; and Fig. 9 is a view similar to Fig. 8 but showing the parts in a different position.

The harvester may be assumed to be of any of the well known commercial types, the binder and certain other parts of which are removed. Of the parts of the harvester, as shown, it is for the purpose of this case only necessary to note, the platform frame 1, the main or traction wheel 2, the grain wheel 3, the elevator frame 4, and the binder deck 5. In this arrangement, the harvester frame 1 is provided with a short forwardly projecting pole 6, hingedly connected thereto by a hinge 6' (Fig. 8). The front end of the tongue is connected to a rearwardly extended brace bar 7, which latter is pivotally connected to the said harvester frame 1 at 7ª. The forward end of the brace bar 7 is adjustably connected to the forward end of the pole 6, preferably by means of a bracket 7ᵇ pivoted at 7ᶜ to the extremity of the bar 7, and slidably mounted on the stub pole 6 by means of the slot 7ᵈ provided in the bracket 7ᵇ and a bolt 7ᵉ passing through the stub pole 6 and the slot in the bracket 7ᵇ. By such a construction, the frame 1 of the harvester, the stub pole 6 and the brace 7 may be secured in rigid relation by tightening the bolt 7ᵉ. When said bolt is loosened and the extremity of the bar 7, together with the bracket 7ᵇ, shifted along the pole 6, the inclination of the harvester frame 1 may be changed, as shown in Fig. 9, so as to cut the grain closer to the ground. Upon again tightening the bolt 7ᵉ, the three elements, to wit, the frame of the harvester 1, the brace bar 7 and the stub pole 6 are held in rigid relation. The numeral 8 indicates a rectangular supplemental truck frame which constitutes the truck frame of the bundle carrying attachment and is located just outward of the binder deck 5 and is connected to the harvester frame, by means presently to be described. This truck frame 8 is provided with a transversely extended intermediate axle 9 that is in axial alinement with the axis of the main wheel 2 of the harvester. Journaled on the axle 9 is a large truck wheel 10, preferably of the same diameter as the main wheel 2. The grain wheel 3 is of smaller diameter than the wheels 2 and 10, but its axis lies in the same transverse vertical plane. This arrangement of the wheels facilitates turning of the machine, as will hereinafter more fully appear. The numeral 11 indicates a long and heavy coupling bar, preferably in the form of a metal pipe, the front portion of which extends transversely of the machine and the main body portion of which extends from front to rear of the machine and is passed through and rigidly secured to the truck frame 8.

To connect the inner front end of the coupling bar 11 to the harvester, the stub pole 6 at its front end is provided with a coupling head 12 having a perforation through which the end of said bar is passed, and, in which the said bar is rigidly secured by a set screw 13, with freedom for adjustments transversely of the machine. It may be here stated, that the adjustment of the said bar 11 and the head 12 should be such that on a second trip around or across the field, the wheel 10 will run on the track made by the main binder wheel 2. Otherwise stated, the adjustment should be such that the distance between the wheels 2 and 10 is equal to the width of the swath cut by the harvester.

At the rear end of the machine, the rear end of the coupling bar 11 is pivotally secured to the outer end of a transverse tie bar 14, (see Fig. 5), the inner end of which tie bar is pivotally connected by a bolt 15, or otherwise, to a suitable portion of the harvester frame 1. As shown, the bolt 15 is passed through a slot 16 in the bar 14 and is secured to the rear end of the brace bar 7. The slot 16 makes it possible to adjust the rear portion of the bundle carrier truck to correspond to the adjustment of the front end portion thereof, which, as already stated, is accomplished by endwise adjustments of the transverse front end portion of the tie bar 11, through the head 12. Also, the adjustments at front and rear, just noted, make it possible to set the wheel 10 parallel to the wheel 2.

At its rear inner corner, the truck frame 8 is provided with a bifurcated bracket 17, through which the intermediate portion of the rear tie bar 14 is passed. The bifurcated portion of this bracket 17 is provided with vertically spaced perforations 18, through any one of which, and the said tie bar 14, a nut-equipped bolt 19 is passed. Adjustment of the bolt 19 in the perforations 18, makes it possible to set the truck frame 8 and the rack carried thereby, presently described, normally level regardless of whether the harvester frame 1 is set high up or low down, as required for cutting long and short grain. It will be noted that when the inclination of the frame 1 of the harvester is changed, the extremity of the stub pole 6 is raised or lowered depending upon the direction of the change in inclination of the frame 1. The front coupling bar 11 will therefore be raised or lowered with the stub pole 6 which tends to cant or distort the framework constituted by the angle-shaped or L-shaped bar 11 and the bar 14 out of the horizontal plane. The truck 8 which is supported or carried by the longitudinal arm of the bar 11 and by the mid portion of the bar 14, also tends to cant or tilt with the frame 11—14. By adjusting the bolt 19 in the perforations 18 above described, it is possible to set the truck frame 8, and the rack carried thereby, normally level regardless of the adjustment of the brace bar 7 and stub pole 6.

A large bundle carrying rack or box 20, to which the pending application above referred to more particularly relates, is carried on and pivotally connected to the truck frame 8, as shown, by a forwardly and rearwardly extended rod or pipe 21, that is located slightly inward of the center of gravity of said rack, so that the said rack, when released, will automatically tilt downward at its outer portion and thereby dump its load. The parts are so constructed, however, that in spite of the location of the rod 21, the rack will be normally held in its receiving position by gravity when unloaded. The dumping movement is prevented when the rack is loaded by a spring-held latch 22, the hook-like beveled end of which (see Fig. 7) normally engages with a projecting detent 23 shown as formed by a projecting ledge of the platform or bottom structure of the said rack. Stops 25 may be adjustably carried by the rack, as shown at 26, to limit the dumping movement of the rack.

The outer side of the rack is normally closed by a movable side section 27 made by the outer ends of a pair of lever bars 28, intermediately pivoted to the upper portions of the front and rear ends of the rack, preferably by bolts 29 inserted through any of several perforations 30, both in the levers and in the upper rails of the ends of the said rack. By inserting the bolt 29 into different perforations 30, the lifting action of the levers on the movable side 27 may be varied, and the effect of the weight of the movable side on the rack may be varied. Connections to the levers 28 are provided, whereby, when the rack is tilted into a dumping position shown by dotted lines in Fig. 6, the movable side 27 will be automatically raised into such position that the entire load may freely slide off from the platform of the rack under the said raised side 27. The connections for this purpose are preferably in the form of rods 32, the upper ends of which are connected to the inner ends of said levers 28, preferably by nut-equipped bolts 33 passed through any one of the several perforations of the coupling heads 34, rigidly secured to the inner ends of the said levers. The lower ends of the rods 32 are adjustably pivoted to end brackets 35, rigidly secured to the projecting ends of a long beam 8ª of the truck frame 8. The adjustable connection between the rods 32 and brackets 35 are preferably made by bolts 36 passed through any one of several horizontally spaced perforations in the said brackets 35. The effect of the adjustments of bolts 32 and 36 on the automatic dumping and return movements of the rack is set forth in detail in the said application relating to the rack, and as such adjustments have no direct bearing on the subject matter of the present invention, the effect of these adjustments need not again be described in detail.

Located just inward of the bundle carrying attachment and in position to receive not only shelled or loose grain from the binder deck 5, but also the bundles, is a large receiving pan 38. This combined grain pan and bundle receiver 38 is supported by a pair of brackets 39, the inner ends of which are adjustably secured to the adjacent side of the attachment truck 8, by means of bolts 39ª. By adjusting the vertical position of the brackets 39, the vertical position of the pan 38 may be changed. Preferably, some means is also provided for adjusting the lateral position of the pan. For this purpose, a set screw 39ᵇ is provided, which, when loosened, will permit the pan to be adjusted laterally on the brackets, but when tightened, will hold the pan in fixed position.

The numeral 40 indicates a seat support and the numeral 41 a combined foot rest and lever support, both of which are carried by the truck frame 8 and are located just at the rear of the grain pan or platform 38. As shown, an operator's seat 42 is mounted on the support 40, and a latch lever 43 and coöperating lock segment 44 are mounted on the support 41.

Two poles 45, connected at their front ends by a tie bar 46, are pivotally mounted on the transverse front portion of the coupling bar 11. These poles 45 are made laterally adjustable on the bar 11 by suitable collars 47 provided with set screws, by means of which they are adjustably secured on the said bar 11. An equalizer draft beam 48 is intermediately pivoted to a draw bar 49, which, in turn, is pivoted on the transverse front portion of the coupling bar 11 and is adjustable thereon, transversely of the machine, being held in working position by a collar 50, having a suitable set screw for securing it in different positions on the said bar 11. The ends of the equalizing bar 48 preferably rest upon the rear end of the poles 45, and they are connected, as shown, to doubletrees 51. With this arrangement, one horse will be located on each side of both of the poles, that is, two of the horses will be located between the poles and two outside of the poles.

The above noted lateral adjustments of the poles 45 and of the equalizing bar or evener 48, make it possible to set the horses where they will draw the entire machine without side draft.

The numeral 52 indicates a caster wheel journaled to the lower rear end of a caster wheel arm 53, the upper end of which is pivoted to a head bracket 54, which, in turn, is rigidly secured to but laterally adjusted on the front transverse portion of the coupling bar 11. The said head 54, as shown, is adjustably secured to the bar 11 by several set screws 55 (see particularly Figs. 2 and 3). In turning the machine, the caster wheel 52 will, of course, oscillate and follow the machine without resistance. When the machine is turned, it moves on the main harvester wheel 2 as a pivot unless, of course, the machine be drawn ahead while it is being turned. The machine, when turning a corner in the field, will turn toward the left, in respect to the driver, and to insure the turning of a short or square corner, I provide a device for causing the outer or right hand pair of horses to do the pulling. This device preferably involves a long cable 56, the front end of which is attached to the right hand or outer end of the equalizer bar 48, and the rear end of which is attached to the before noted latch lever 43. The intermediate portion of this cable 56 is passed over suitable guides 57 on the truck frame 8. When the corner is to be turned, as above stated, the lever 43 will be thrown forward, thereby causing the outer pair of horses to do the pulling, while the inner pair of horses are pulled back by the reins, to prevent them from pulling. When this is done, the outer horses will turn the machine on the wheel 2 as a pivot, simply by a direct pulling action, due to the fact that they are located far outside of the center of draft of the machine and far outward of the said wheel 2. Hence, the machine may be turned without pulling the neck yokes.

The complete machine, above described, is too wide to pass over an ordinary country bridge or through an ordinary gate, and hence I provide means for detaching the bundle carrying attachment from the harvester and connecting the same to and in front of the harvester, so that the two will be drawn in tandem. For the above purpose, I consistently attach a short draw bar 58 to the rearwardly projecting end of the coupling bar 11. The bundle carrying attachment may be disconnected from the harvester very easily, simply by removing the bolt 15 (see Fig. 5) and drawing the front end of the coupling bar 11 out of the coupling head 12, while the set screw 13 is loosened. This being done, the bundle carrying attachment is moved in front of the harvester and the rear end of the draw bar 58 is, by means of a bolt 59, coupled to the head 12 of the stub pole 6. The bundle carrying attachment and harvester will then be drawn in tandem or one ahead of the other, and they will then pass through any opening or over any bridge which an ordinary harvester may pass. To maintain a good balance of the bundle carrying attachment while used, as above stated, it is desirable to attach an auxiliary wheel 10$^a$ of the same diameter as the wheel 10 to the inner end 9$^a$ of the axle 9. This wheel 10$^a$ is indicated by dotted lines in Figs. 1 and 7.

As before stated, the bundles, as well as the shelled or loose grain will be delivered from the binder onto the combined grain pan and bundle receiver. The operator, while seated in the seat 42 with his feet resting on the foot rest 41, will, by means of a fork, easily throw the bundles from the pan 38 into the dumping rack, about as fast as they are delivered from the binder. If, however, the horses require his attention, or for other reasons, his attention is required for a short time, the bundles will accumulate in the said pan 38 and may be later thrown into the rack.

It will be noted from the foregoing construction that in order to connect the attachment with the harvester, it is only necessary to insert the front coupling bar 11 through the bracket 12 carried by the stub pole 6, and to connect the rear coupling bar 14 with the rear end of the brace bar 7, which is carried by the harvester frame 1. The attachment is positioned in such relation to the harvester, however, as to cause the main wheel 10 of the attachment to follow directly in the track made by the main wheel 2 of the harvester on a previous trip across the field. This is an important feature for obvious reasons, such as reducing the draft. When the attachment is properly positioned with respect to the harvester, the equalizer bar 48 is adjusted on the coupling bar 11 to bring the line of draft directly between the attachment and the harvester or to so locate the line of draft as to equalize the draft between the attachment and the harvester.

Due to the fact that the caster-wheel 52 is adjustable along the front connecting bar 11, a perfect balance can be obtained of the construction supported at the points constituted by the caster-wheel 10, the connection 15 and the connection 12. If the caster-wheel were located too far to the right (Figs. 1 and 2), the lower left hand corner of the frame 11—14—7 would tend to tilt downwardly, and if said caster-wheel were positioned too far to the left in Fig. 2, the lower right hand corner of the above-mentioned frame (Fig. 1) would tend to tilt downwardly. The relative position of the caster-wheel 52 with respect to the wheels 10 and 2 is, therefore, very important, as it serves to coöperate with said wheels to properly support the entire load. However, it is to be noted that only one main wheel is provided for the attachment, to wit, the truck wheel 10, and this makes it possible in turning corners to have the entire construction pivot around the wheel 2 as a center, due to the fact that said wheel 10 can be placed in alinement with the wheels 2 and 3. The caster-wheel accommodates itself to the direction of travel of the attachment by swiveling in a well-known manner, and therefore does not interfere with the turning movement of the combined machine around the wheel 2 as a pivot. It will also be noted that the proper balancing of the parts is further made possible by passing the longitudinal arm of the connecting bar 11 to one side of the wheel 10, as shown in Fig. 7, and passing the pivot rod 21 for the rack to the other side of said wheel 10. In this way, the weight of the rack and its contents is properly transmitted from the pivot rod 21 to the truck 8, which, in turn, transmits the aforesaid weight to the connecting bar 11 supported by the truck wheel 10.

When the attachment is positioned closer to or farther from the harvester to vary the width of the swath, the combined bundle and grain receiving pan 38 is preferably adjusted accordingly, by loosening the set screw 39$^b$ and sliding the pan laterally to its proper position relative to the binder deck 5. Adjustments at 18—19 and 7$^b$—7$^e$ will affect the vertical relation between the grain pan and the binder deck. It is therefore advantageous when adjustments are made at the said points to adjust the vertical position of the brackets 39, in order to maintain the proper vertical relation between the grain pan and the binder deck. A further advantage of so constructing the parts as to be able to employ a single supporting wheel 10 lies in the fact that the different parts of the combined construction are independently movable. For instance, when traveling on uneven ground and the grain wheel 3 and the outer end of the harvester frame is raised, such movement will have no effect on the attachment, due to the swivel connection provided on the stub pole 6 at 12', and the pivotal connection between the harvester and the attachment at the point 15. On the other hand, the rack and its supporting wheel 10 may be raised without affecting the harvester, and the intermediate wheel 2 may pass over relatively high ground without affecting either of the wheels 10 or 3.

What I claim is:—

1. The combination with a self-binding harvester having a forwardly projecting stub pole, of an auxiliary truck located on the binder side of said harvester and provided with front and rear coupling bars, the said front coupling bar being adjustably connected to the front end of said stub pole and the said rear bar serving to adjustably connect the rear portions of the binder frame and auxiliary truck frame, a rack mounted on said auxiliary truck, and draft connections to said auxiliary truck.

2. The combination with a self-binding harvester having a stub pole, of an auxiliary truck connected thereto on the binder side thereof, a front coupling bar secured to the frame of said auxiliary truck, a rear coupling bar connecting the rear portion of the frame of said auxiliary truck to the rear portion of the harvester frame, a dumping rack carried by said auxiliary truck, and a vertically adjustable connection between the inner portion of said auxiliary truck and the intermediate portion of said rear coupling bar, whereby the level of said rack may be maintained in all vertical adjustments of the harvester frame.

3. The combination with a self-binding harvester having a forwardly projecting stub pole, of an auxiliary truck having a rack and connected to said harvester on the binder side thereof, by means including a transverse front coupling bar adjustably attached to the stub pole of said harvester, and draft connections applied to the said front coupling bar and throwing the center of the line of draft between said harvester and auxiliary truck, the said draft connections being adjustable on said coupling bar transversely of the machine.

4. The combination with a self-binding harvester having a forwardly projecting stub pole, of an auxiliary truck having a rack connected to said harvester on the binder side thereof, by means including a transverse front coupling bar adjustably attached to the stub pole of said harvester, a pair of laterally spaced poles connected to said front coupling bar and laterally adjustable thereon, and an equalizing bar connected to said front coupling bar between the said poles and adjustable on said coupling bar transversely of the machine.

5. The combination with a harvester, of an auxiliary truck provided with a rack and with a main traction wheel, devices connecting said auxiliary truck to the harvester for traveling movements therewith, an equalizing draft beam connected to the machine at a point between the harvester and auxiliary truck, and a connection to one end of said equalizing beam, for pulling the same rearward, to thereby throw a strain on one side of said equalizing beam to facilitate the turning of corners with the machine.

6. The combination with a self-binding harvester having the usual traction and grain wheels, of a three-sided frame connected at its free ends to the harvester on the binder side thereof, a truck carried by the intermediate portion of the frame, a supporting wheel associated with said truck in axial alinement with said traction and grain wheels and spaced laterally therefrom approximately the width of the swath cut by the harvester, and a caster wheel carried by the front portion of said frame and adjustable thereon transversely of the machine.

7. The combination with a self-binding harvester having the usual traction and grain wheels, of a three sided frame connected at its free ends to the harvester on the binder side thereof, a truck carried by the intermediate portion of the frame, a supporting wheel associated with said truck, and a caster wheel carried by the front portion of said frame, said caster wheel being adjustable on said frame transversely of the machine.

8. The combination with a harvester frame, of a stub pole hingedly connected thereto, a brace bar connected to the stub pole and to the harvester frame, the connection between the stub pole and brace bar being adjustable to vary the inclination of the harvester frame, a three sided attachment frame connected at its front free end to said stub pole and at its rear free end to said brace bar, a rack supporting truck carried by the intermediate portion of the frame, and means to adjust the level of said truck relative to the frame, whereby the level of said truck may be maintained irrespective of the adjustments between said stub pole and said brace bar.

9. The combination with a harvester frame, of a stub-pole hingedly connected thereto, a brace bar hingedly connected at one end to the rear portion of the harvester frame and extending directly toward the stub pole, the connection between the stub pole and the brace bar being adjustable to vary the inclination of the harvester frame.

10. The combination with a harvester frame, of a stub-pole hingedly connected thereto, a brace bar, a pivotal connection between one end of the brace bar and the stub-pole, and a pivotal connection between the other end of the brace bar and the rear portion of the harvester frame, one of said connections being adjustable to vary the inclination of the harvester frame.

11. The combination with a self-binding harvester provided with a stub pole, of an attachment frame connected thereto, said frame comprising a horizontally disposed L-shaped member disposed on the binder side of the harvester and adjustably connected at the extremity of its front transverse arm with said stub pole, a connecting bar connected to the extremity of the longitudinal side arm of said L-shaped member and adjustably connected to the frame of the harvester, and a supporting wheel associated with said attachment frame.

12. The combination with a self-binding harvester having the usual traction and grain wheels, of a three-sided frame adjustably connected at its free ends to the harvester on the binder side thereof, a truck carried by the intermediate portion of the frame, a supporting wheel associated with said truck and in axial alinement with said harvester traction and grain wheels, and a caster wheel carried by the front portion of said frame and adjustable thereon.

13. The combination with a harvester having a forwardly projecting stub-pole, of a horizontally-disposed L-shaped member adjustably connected near the extremity of one of its arms to said stub-pole, the other arm being extended rearwardly, and an an attachment connected to the horizontally-extended portion of said member.

14. The combination with a harvester, of an L-shaped member having a front portion adjustably connected to the front of the harvester for adjustments transversely thereof, and a second portion extended rearwardly, an attachment connected to the rearwardly extended portion, and draft connections applied to the front portion of said member and adjustable thereon transversely of the harvester.

15. The combination with a harvester, of an L-shaped member having a front portion adjustably connected to the front of the harvester for adjustments transversely thereof, and a second portion extended rearwardly, an attachment connected to the rearwardly extended portion, draft connections applied to the front portion of said member and adjustable thereon transversely of the harvester, and a caster wheel carried by the front portion of said member and also adjustable thereon.

16. The combination with a harvester having a hinged forwardly projecting stub pole, of a three-sided horizontally disposed frame connected near one of its free extremities to said stub pole and near the other of its free extremities to the rear of the harvester frame, a truck carried by said three-sided frame, a supporting wheel associated with said truck, a brace bar hinged to the harvester frame and adjustably connected to said stub pole whereby the inclination of the harvester frame may be varied, and means to maintain said three-sided frame in substantially a horizontal plane irrespective of the inclination of the harvester frame.

In testimony whereof I affix my signature, in presence of two witnesses.

JACOB J. PAYER.

Witnesses:
VERNON T. HOUGHTON,
ARTHUR L. BRYANT.

Copies of this patent may be obtained for five cents each, by addressing the "Commissioner of Patents, Washington, D. C."